(12) United States Patent
Zhou et al.

(10) Patent No.: US 10,962,734 B2
(45) Date of Patent: Mar. 30, 2021

(54) VIRTUAL REALITY APPARATUS

(71) Applicants: BOE Technology Group Co., Ltd., Beijing (CN); K-Tronics (Suzhou) Technology Co., Ltd., Jiangsu (CN)

(72) Inventors: Zhang Zhou, Beijing (CN); Ronghui Lin, Beijing (CN); Ming Chen, Beijing (CN)

(73) Assignees: BOE TECHNOLOGY GROUP CO., LTD., Beijing (CN); K-TRONICS (SUZHOU) TECHNOLOGY CO., LTD., Suzhou (CN)

( * ) Notice: Subject to any disclaimer, the term of this patent is extended or adjusted under 35 U.S.C. 154(b) by 386 days.

(21) Appl. No.: 16/165,504

(22) Filed: Oct. 19, 2018

(65) Prior Publication Data

US 2019/0302394 A1 Oct. 3, 2019

(30) Foreign Application Priority Data

Mar. 30, 2018 (CN) .......................... 201820480524.9

(51) Int. Cl.
*G02B 7/02* (2021.01)
*G02B 7/12* (2021.01)

(52) U.S. Cl.
CPC ............ *G02B 7/023* (2013.01); *G02B 7/021* (2013.01); *G02B 7/12* (2013.01)

(58) Field of Classification Search
CPC .......... G02B 7/023; G02B 7/12; G02B 7/021
USPC ................................. 359/410–418, 822–823
See application file for complete search history.

(56) References Cited

U.S. PATENT DOCUMENTS

2020/0310137 A1* 10/2020 Lan .................... G02B 27/0149

FOREIGN PATENT DOCUMENTS

| CN | 205750114 | * 10/2016 | ............ G02B 27/01 |
| CN | 107807447 | * 3/2018 | ......... G02B 27/0149 |

* cited by examiner

*Primary Examiner* — George G King
(74) *Attorney, Agent, or Firm* — McDermott Will & Emery LLP

(57) ABSTRACT

Embodiments of the present disclosure provide a virtual reality apparatus. The virtual reality apparatus includes a display screen and a display screen support configured to support the display screen; a lens assembly and a barrel support configured to hold the lens assembly; and an object distance adjustor coupled between the display screen support and the barrel support respectively, the object distance adjustor being configured to adjust a distance between the display screen support and the barrel support.

10 Claims, 2 Drawing Sheets

VIRTUAL REALITY APPARATUS

CROSS-REFERENCE TO RELATED APPLICATION

This application claims the priority benefit of Chinese Patent Application No. 201820480524.9, titled by "VIRTUAL REALITY APPARATUS", filed with the State Intellectual Property Office of China on Mar. 30, 2018, the whole disclosure of which is incorporated herein by reference.

TECHNICAL FIELD

Embodiments of the present disclosure generally relate to the technical field of virtual reality, and particularly to a virtual reality apparatus.

BACKGROUND

Technology of virtual reality relates to a computer imitated system that may establish a virtual world for a user to experience. It generates a virtual environment by using a computer to allow a user to enjoy within the virtual environment. Technology of virtual reality has been developed rapidly and vigorously, and a lot of virtual reality apparatuses appear in the market, such as virtual reality glasses. However, a user still hopes to get a virtual reality glasses that can provide better use experience.

SUMMARY

Embodiments of the present disclosure provide a virtual reality apparatus which may improve a user's use experience.

According to an aspect, there is provided a virtual reality apparatus, including: a display screen and a display screen support configured to support the display screen; a lens assembly and a barrel support configured to hold the lens assembly; and an object distance adjustor coupled between the display screen support and the barrel support respectively, the object distance adjustor being configured to adjust a distance between the display screen support and the barrel support.

According to an aspect, the object distance adjustor comprises a plurality of adjustment screw rods disposed perpendicularly to the display screen and located at edges of at least two opposite sides of the barrel support; one end of each of the adjustment screw rods is coupled to the barrel support and the other end is provided with an outer screw thread thereon; a plurality of first support columns, each having a tubular shape, are disposed at positions, corresponding to the adjustment screw rods respectively, on the display screen support and each are provided with inner screw threads on inner walls thereof such that the adjustment screw rods are capable of screwing into the first support columns respectively through threaded engagement between outer screw threads of the adjustment screw rods and the inner screw threads on the inner wall of the first support columns, thereby adjusting the distance between the display screen support and the barrel support by screwing the adjustment screw rods into or out of the first support columns respectively.

According to an aspect, the object distance adjustor further comprises a plurality of transmission screw rods each disposed between adjacent two ones of the adjustment screw rods in a direction perpendicular to a length direction of the adjustment screw rods; wherein, one of the plurality of adjustment screw rods is provided with an adjustment gear and the remainder ones of them are each provided with a first transmission gear; both ends of the transmission screw rod are respectively provided with a second transmission gear, and the second transmission gear is configured to engage, for transmission, with the adjustment gear or the first transmission gear of a corresponding one of the adjustment screw rods; the adjustment gear is provided to be driven to rotate so as to drive the second transmission gears that are engaged therewith to rotate and in turn drive the adjustment screw rods to screw into or out of the first support columns respectively, thereby adjusting the distance between the display screen support and the barrel support.

According to an aspect, the object distance adjustor comprises five adjustment screw rods and four adjustment screw rods, wherein four ones of the adjustment screw rods are respectively disposed at four corners of the barrel support and a remainder one of the adjustment screw rods is disposed at a center position of a longer side of the barrel support.

According to an aspect, the lens assembly comprises a first barrel and a second barrel, and a first lens provided on the first barrel and a second lens provided on the second barrel; and the virtual reality apparatus further comprises a pupillary distance adjustor configured to adjust a distance between the first barrel and the second barrel.

According to an aspect, the pupillary distance adjustor comprises: two pupillary distance adjusting screw rods disposed on the barrel support and arranged parallel to a direction in which the first barrel and the second barrel are arranged; and adjustment convex lugs respectively disposed on outer walls of the first barrel and the second barrel; one end of each of the pupillary distance adjusting screw rods is rotatably coupled to a corresponding one of the adjustment convex lugs of the barrel support, and the other end is located outside of the barrel support; the pupillary distance adjusting screw rods are each provided with outer screw threads thereon; the adjustment convex lugs are each provided with inner screw threads on their inner walls; and each of the pupillary distance adjusting screw rods is configured to pass through the corresponding one of the adjustment convex lugs such that the pupillary distance adjusting screw rods are driven to be rotated through engagement between the outer screw thread of the pupillary distance adjusting screw rods and the inner screw thread of the adjustment convex lugs, so as to drive the first barrel or the second barrel, which is in thread engagement with the pupillary distance adjusting screw rod and provided with the corresponding adjustment convex lug, to reciprocate along the barrel guide rod.

According to an aspect, ends of the pupillary distance adjusting screw rods that are inserted into the barrel support are coupled to the barrel support through bearings respectively.

According to an aspect, ends of the pupillary distance adjusting screw rods that are located outside the barrel support are provided with knobs respectively.

According to an aspect, a barrel guide rod is provided on the barrel support to be parallel to a direction in which the first barrel and the second barrel are arranged; a first fixing lug and a second fixing lug are respectively provided on outer walls of the first barrel and the second barrel, and the barrel guide rods pass through the first fixing lug and the second fixing lug respectively such that the first barrel and the second barrel are coupled to the barrel support in such a manner that they are slidable on the barrel guide rods and are capable of reciprocating along the barrel guide rods respectively.

According to an aspect, the object distance adjustor further comprises three or more support guide rods configured to be not located in a straight line; the display screen support comprises three or more tubular second support columns corresponding to the support guide rods respectively such that one end of each of the support guide rods is fixedly coupled to a surface, facing the display screen support, of the barrel support and the other end is inserted into a corresponding one of the second support columns, forming muff-coupling between the other end and the corresponding second support column; and each of the support guide rods is capable of reciprocating in the corresponding one of the second support columns with movement of the barrel support.

According to an aspect, the adjustment gear, the first transmission gear and the second transmission gear are all bevel gear or angle gear.

According to an aspect, a size of the adjustment gear is greater than that of the first transmission gear; and a plurality of bar-shaped projections are provided at a constant interval on an outer circumference of the adjustment gear.

According to an aspect, the barrel support is provided with a barrel lid configured to cover the barrel.

BRIEF DESCRIPTION OF THE DRAWINGS

In order to describe technical schemes of embodiments of the present disclosure or the prior art more clear, a simply description of drawings that are used in describing the embodiments of the present disclosure or the prior art is made below. Obviously, the drawings merely relate to some of the embodiments of the present disclosure and other drawings may be obtained by those skilled in the art based on those drawings described herein without any inventive labor.

DETAILED DESCRIPTION

A clear and complete description of technical schemes of embodiments of the present disclosure will be made by reference to the drawings. Obviously, the embodiments that are described herein merely relate to some, not all, of the embodiments of the present disclosure. Based on the disclosed embodiment herein, all of other embodiments that are obtained by those skilled in the art without inventive labor belong to protective scope of the present disclosure.

In the present disclosure, terms such as "first", "second" are merely used for description, instead of meaning or indicating relative importance or number of a feature. As such, a feature that is defined by "first" or "second" may impliedly include one or more the feature. In the present disclosure, "a plurality of" means two or more unless a reverse description is made.

Unless definitely defined or specified, terms such as "mount", "couple", "engage", "connect" should be understood in broad sense. For example, it may be understood as a fixedly coupling, a removable coupling, an integral engagement, a mechanical engagement, an electrical coupling, a directly coupling, an indirect coupling through an intermediate medium, an inner coupling between two components, or wired or wireless communication coupling. The above terms may be understood by those skilled in the art in the present disclosure according to specific situations.

The existing virtual reality glasses commonly have an integral or fixed structure, that is, a distance between a screen and lenses of the virtual reality glasses can never be adjusted, which results in a unvaried optical imaging effect. However, different people have different vision conditions and thus will watch different virtual image of the screen when wearing a same virtual reality glasses. In fact, most of users watch a rather blurry image of the display screen, resulting in a bad watching experience.

An embodiment of the present disclosure may solve at least the problem that a user may watch a blurry image of the display screen when wearing a virtual reality apparatus since an object distance of the virtual reality apparatus is nonadjustable.

Figure 1:
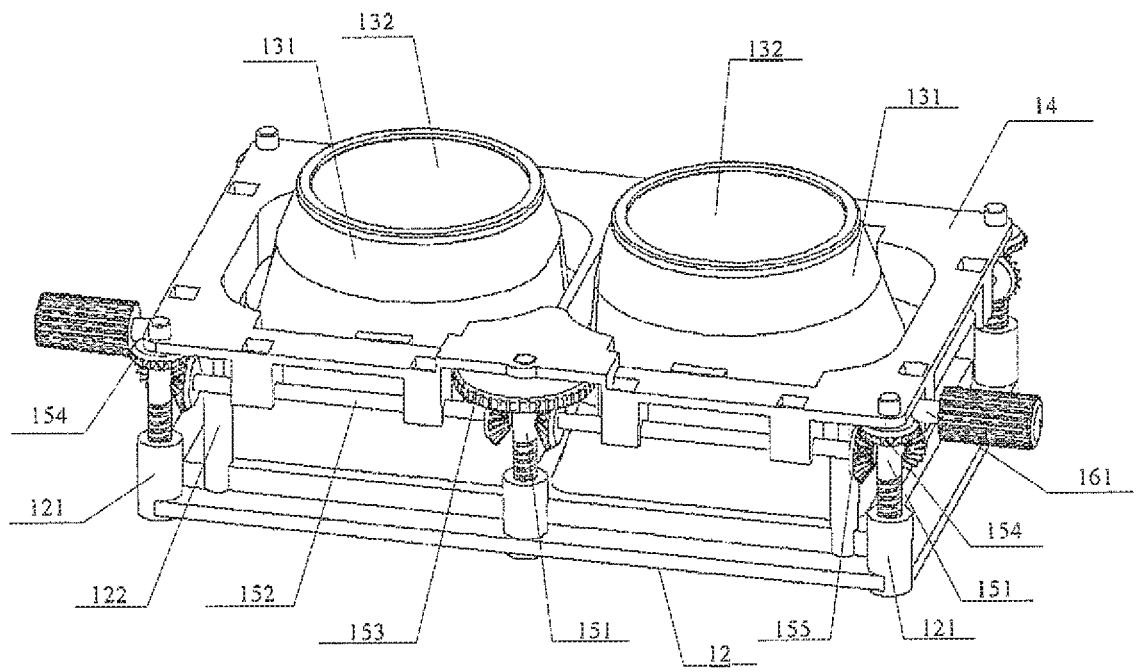
FIG. 1 is a schematic structural view of a virtual reality apparatus according to an embodiment of the present disclosure.
Figure 2:
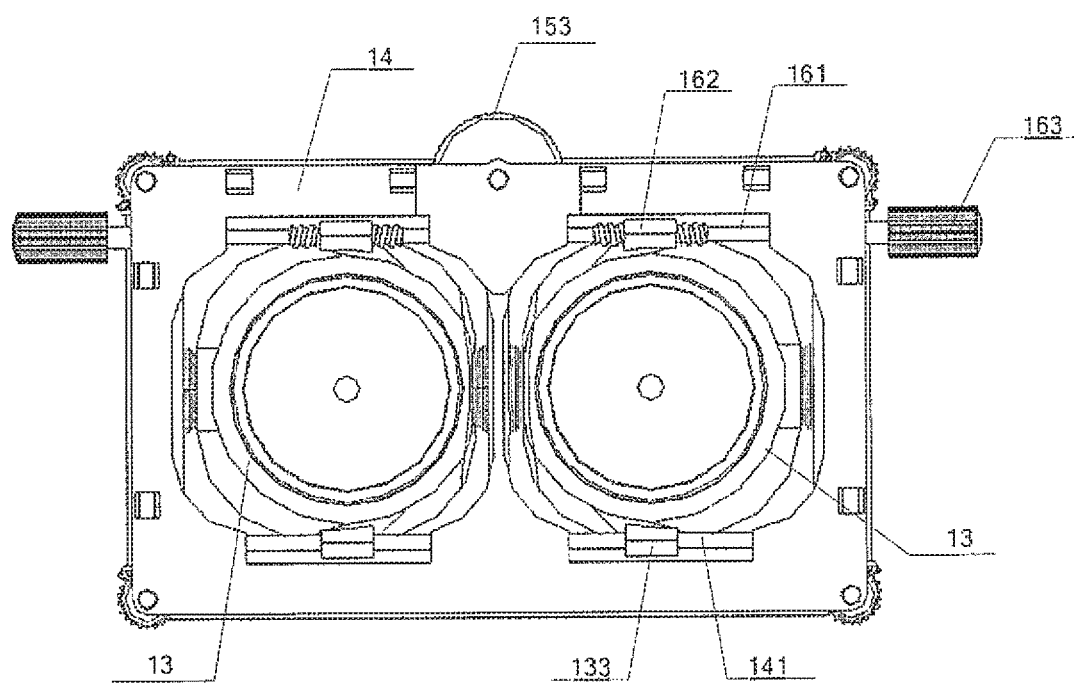
FIG. 2 is a schematic structural view of a virtual reality apparatus according to an embodiment of the present disclosure.
Figure 3:
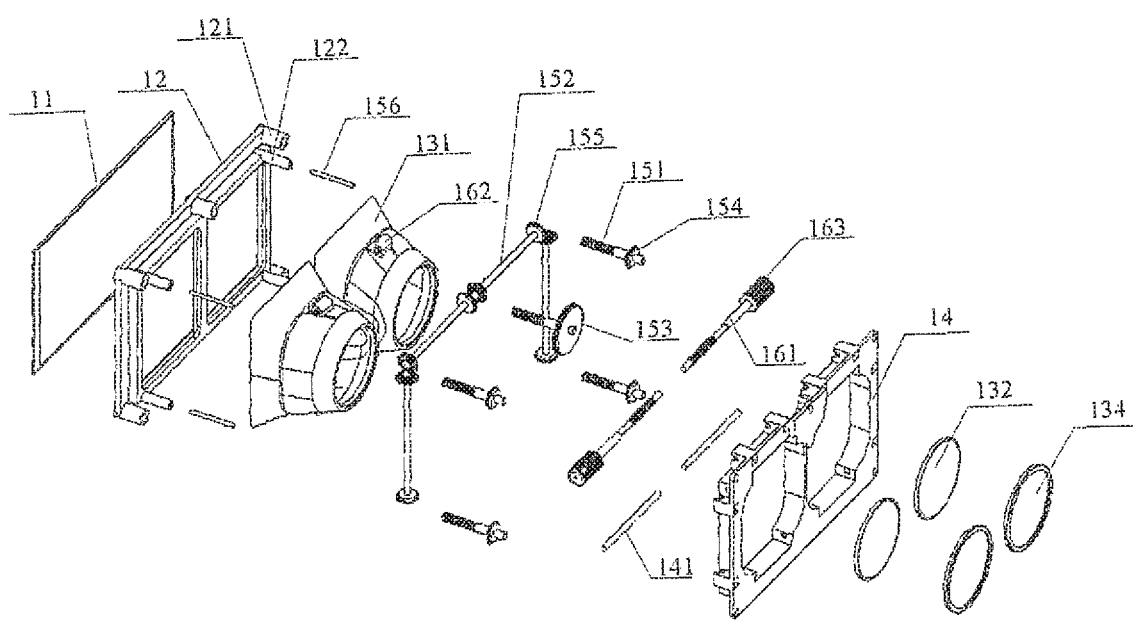
FIG. 3 is a schematic exploded view of a virtual reality apparatus according to an embodiment of the present disclosure.

For example, an embodiment of the present disclosure provides a virtual reality apparatus, as shown in FIGS. 1-3, including a display screen 11 and a display screen support 12 configured to support the display screen 11; a lens assembly 13 and a barrel support 14 configured to hold the lens assembly 13; and an object distance adjustor configured to be coupled to the display screen support 12 and the barrel support 14 respectively, the object distance adjustor being configured to adjust a distance between the display screen support 12 and the barrel support 14.

In the embodiment, the display screen 11 may be a device having a display function, such as, a liquid crystal display, or a mobile phone or a panel computer, and is not particularly limited herein.

The display screen support 12 is provided to hold the display screen 11. The display screen 11 may be coupled to the display screen support 12, removably or non-detachably.

The lens assembly 13 is provided to refract a picture displayed on the display screen 11 to eyes of a user, forming a virtual image in eyes of the user. The lens assembly 13 generally includes two lenses 132, which are respectively used for right eye and left eye of a user.

As the display screen support 12 holds the display screen 11 and the barrel support 14 holds the lens assembly 13, adjusting a distance between the display screen support 12 and the barrel support 14 results in adjustment of a distance between the lens assembly 13 and the display screen 11, that is, in adjustment of an object distance of the virtual reality apparatus.

With this configuration, the virtual reality apparatus according to the embodiment includes the object distance adjustor configured to adjust the distance between the display screen support 12 and the barrel support 14, i.e. to adjust the distance between the lens assembly 13 and the display screen 11 such that a user may adjust the object distance of the virtual reality apparatus according to his or her own eye vision condition to obtain a most clear and comfortable visual image effect, improving user experience.

Further, referring to FIGS. 1-3, the object distance adjustor includes a plurality of adjustment screw rods 151 disposed perpendicularly to the display screen 11 and located at edges of at least two opposite sides of the barrel support 14. One end of each of the adjustment screw rods 151 is coupled to the barrel support 14 and the other end is provided with an outer screw thread thereon. Correspondingly, a plurality of first support columns 121, each having a tubular shape, are disposed at positions, corresponding to the adjustment screw rods 151 respectively, on the display screen support 12 and each are provided with inner screw threads on inner walls thereof such that the adjustment screw rods 151 are capable of screwing into the first support columns 121 respectively through threaded engagement between the outer screw threads of the adjustment screw rods 151 and the inner screw threads on the inner walls of the first support columns 121, thereby adjusting the distance between the display screen support 12 and the barrel support 14 by screwing the adjustment screw rods into the first support columns respectively. In the embodiment, distances between a right lens and a left lens of the lens assembly 13 (commonly including two lenses) and the display screen may be individually adjusted by adjustment of the adjustment screw rods 151, which is advantage for users whose eyes are not in the same vision condition.

The object distance adjustor may further include a plurality of transmission screw rods 152 disposed between adjacent two ones of the adjustment screw rods 151 in a direct perpendicular to a length direction of the adjustment screw rods 151. One of the adjustment screw rods 151 is provided with an adjustment gear 153 and the remainder ones of them are each provided with a first transmission gear 154. Each end of the transmission screw rod 151 is provided with a second transmission gear 155, and the second transmission gear 155 is configured to engage with the adjustment gear 153 or the first transmission gear 154 of a corresponding one of the adjustment screw rods 151, for achieving transmission. The adjustment gear 153 can be driven to rotate so as to drive the second transmission gears 155 that is engaged therewith to rotate and in turn drive the adjustment screw rods 151 to screw into or out of the first support columns 121 respectively, thereby adjusting the distance between the display screen support and the barrel support.

In practice, the adjustment gear 153, the first transmission gear 154 or the second transmission gear 155 may be a bevel gear or angle gear.

Embodiments of the present disclosure do not limit specific number of the adjustment screw rods 151 and the transmission screw rods 152. In an embodiment, in order to obtain a stable structure while facilitating manual adjustment, referring to FIGS. 1 and 2, the object distance adjustor includes five adjustment screw rods 151 and four transmission screw rod 152, four ones of the adjustment screw rods 151 are respectively disposed at four corners of the barrel support 14 and a remainder one of the adjustment screw rods is disposed at a center position of a longer side of the barrel support 14. In the embodiment, it is advantage that the adjustment gear 153 is disposed on the one of the adjustment screw rods 151 that is located at the center position as there is a space at the center position (between two circle lenses) allowing an adjustment gear 153 to have a bigger size without increasing the size of the whole apparatus, such that the adjustment gear 153 may be used conveniently.

Herein, the center position is not limited to an exact center point, but a position at a middle section of the longer side of the barrel support 14 may be used in the embodiments of the present disclosure. For example, in an embodiment, four ones of the adjustment screw rods 151 are respectively disposed at four corners of the barrel support 14 and the remaining one of them is disposed at a position of the longer side of the barrel support 14 that departs from a center point of the side. With this configuration, the transmission screw rods 152 at either side of the remainder one of the adjustment screw rods 151 may have different lengths. However, it is understood that this will not adversely affect transmission between the adjustment screw rods 151 and the transmission screw rods 152.

As shown in FIG. 1, when a user rotates the adjustment gear 153, the adjustment screw rod 151 that is provided with the rotated adjustment gear 153 is rotated and in turn drives one of the second transmission gears 155, which is disposed at an end of the transmission screw rod 152 and engaged with the rotated one of the adjustment screw rods 151, to rotate. Then, the transmission screw rod 152 is rotated together with the second transmission gear 155, and the other one of the second transmission gears 155 at the other end of the transmission screw rod 152 thus drives the first transmission gears 154 located at the corners of the barrel support 14 to rotate, which in turn drives the adjustment screw rods 151 located at the corners of the barrel support 14 to rotate. In a similar manner, two ones of the adjustment screw rods 151 at rear side in Figure are synchronously rotated. As the adjustment screw rods 151 are fixedly coupled to the barrel support 14 while the first support columns 121 on the display screen support 12 are coupled to the adjustment screw rods 151 through thread engagement between the inner screw threads on the inner wall of the first support columns 121 and the outer screw threads on the adjustment screw rods 151, an amount by which the adjustment screw rods 151 may be screwed into or out of the first support columns 121 may be controlled by adjusting the rotation direction of the adjustment gear 153, so as to adjust the distance between the display screen support 12 and the barrel support 14. According to the embodiment, rotation of one adjustment gear 153 may drive the second transmission gears 155 and the first transmission gears 154 and in turn drive the adjustment screw rods 151 to rotate synchronously, thereby screwing into or out of the first support columns 121 respectively. With this configuration, the barrel support 14 may as a whole be translated without deflexion and thus may be operated simply.

In order to ensure stability of the structure during adjustment of the object distance, referring to FIGS. 1 and 3, the object distance adjustor may include three or more support guide rods 156 not located in a same straight line, such as four support guide rods 156 (alternatively, more support guide rods 156); and four tubular second support columns 122 are arranged at four corners of the display screen support 12. One end of each of the support guide rods 156 is fixedly coupled to a surface, facing the display screen support 12, of the barrel support 14 and the other end of the each of the support guide rods 156 is inserted into a corresponding one of the second support columns 122, forming a muff-coupling or sleeve coupling between the other end and the corresponding second support column. Each of the support guide rods 156 is capable of moving up and down (for example, as shown in FIG. 1) in a corresponding one of the second support columns 122 with movement of the barrel support 14. Each support guide rod 156 may function to guide and limit movement of one of the second support columns 122 along the support guide rod, such that each second support column 122 is subject to guiding and limiting of a corresponding one of the support guide rods 156 during movement towards or away from the display screen support 12 together with the barrel support 14, and thus the barrel support 14 will not move in a traverse direction to the moving direction of the barrel support 14 during movement of the barrel support 14 towards or away from the display screen support 12.

When performing adjustment of the object distance of the virtual reality apparatus, in order to facilitate manual operation, the adjustment gear 153 is provided to have a size greater than that of the first transmission gears 154 and to have a plurality of bar-shaped projections at a constant interval on an outer circumference of the adjustment gear 153.

In practice, as pupillary distances are different for people, a pupillary distance adjustor may be provided to adjust a pupillary distance of a virtual reality apparatus such that a user can obtain clearer and more comfortable visual image effect. In an embodiment, the lens assembly 13 includes two barrels 131 and two lenses 132 respectively disposed on the two barrels 131. The virtual reality apparatus further includes a pupillary distance adjustor configured to adjust a distance between the two barrels 131, i.e., a distance between two lenses 132, which is also a pupillary distance of the virtual reality apparatus.

Specifically, referring to FIGS. 1-3, the barrel support 14 is provided with a pupillary distance adjustor. The pupillary distance adjustor may include two pupillary distance adjusting screw rods 161 disposed on the barrel support 14 and arranged parallel to a direction in which two barrels 131 are arranged, and adjustment convex lugs 162 respectively disposed on outer wall of the two barrels 131. One end of each of the two pupillary distance adjusting screw rods 161 is rotatably coupled to the adjustment convex lugs 162 of the barrel support 14, and the other end of the each of the two pupillary distance adjusting screw rods is located outside of the barrel support. The pupillary distance adjusting screw rods 161 are provided with outer screw threads thereon; the adjustment convex lugs 162 are provided with inner screw threads on their inner walls, and the pupillary distance adjusting screw rods 161 are configured to each pass through a corresponding one of the adjustment convex lugs 162 such that the pupillary distance adjusting screw rods 161 are driven to be rotated through engagement between the outer screw threads of the pupillary distance adjusting screw rods 161 and the inner screw threads of the adjustment convex lugs 162, so as to drive the barrels 131 to reciprocate along the barrel guide rods 141 respectively. In the embodiment, ends of the pupillary distance adjusting screw rods 161 that are inserted into the barrel support 14 are coupled to the barrel support 14 through bearings. In order to facilitate manual operation of the pupillary distance adjusting screw rods 161, the pupillary distance adjusting screw rods 161 are respectively provided with knobs 163 at the ends thereof that are located outside of the barrel support 14.

In an embodiment, the barrel support 14 is provided with two barrel guide rods 141 disposed parallel to a direction in which the two barrels 131 are arranged. A fixing lug 133 is provided on an outer wall of each of the two barrels 131. The barrel guide rods 141 respectively pass through two fixing lugs 133 such that the two barrels 131 are coupled to the barrel support 14; and the barrels 131 may each reciprocate along a corresponding one of the barrel guide rods 141.

The fixing lugs 133 may be disposed on a side of the barrels 131 opposite to the side where the adjustment convex lugs 162 are disposed. The barrels 131 are held in such a manner that they can reciprocate relative to the barrel support 14, by muff-coupling or sleeve coupling between the fixing lugs 133 and the barrel guide rods 141 and through thread engagement between the adjustment convex lugs 162 and the pupillary distance adjusting screw rods 161.

Referring to FIG. 2, the lens assembly 13 is coupled to the barrel support 14 through the barrel guide rods 141 and the pupillary distance adjusting screw rods 161. The barrel guide rods 141 function to guide the lens assembly 13 such that the lens assembly 13 may move right and left along the barrel guide rods 141. The pupillary distance adjusting screw rods 161 are threadedly coupled to the adjustment convex lugs 162 on the barrels 131 of the lens assembly 13. When the knob 163 on one of the pupillary distance adjusting screw rods 161 are rotated, the pupillary distance adjusting screw rods 161 are rotated relative to the adjustment convex lugs 162 respectively such that the lens assembly 13 move right or left by means of the screw thread, thereby adjusting the distance between the two barrels 131. In FIG. 2, the left pupillary distance adjusting screw rod 161 is provided for right-to-left movement of the left barrel 131 and the right pupillary distance adjusting screw rod 161 is provided for right-to-left movement of the right barrel 131, thereby achieving individual adjustment of the right eye barrel and the left eye barrel.

Referring to FIG. 3, the barrel support 14 is further provided with barrel lids 134. When the virtual reality apparatus is not used, the barrels 131 may be covered by the barrel lids 134, preventing the lens 132 from contamination from impurity in environment.

Referring to FIG. 3, the virtual reality apparatus according to the embodiment may be assembled in a following manner: firstly, the adjustment gear 153, the adjustment screw rods 151 and the transmission screw rods 152 are fixedly coupled to the barrel support 14, and subsequently, the display screen 11, the support guide rods 156 and the barrels 131 are mounted onto the display screen support 12; then, the lenses 132 and the barrel lids 134 are mounted onto the barrels 131, and thereafter, the display screen support 12 and the barrel support 14 are assembled. Finally, the pupillary distance adjusting screw rods 161 are mounted, thereby completing assembly of the virtual reality apparatus and enabling adjustment of the pupillary distance and the object distance of the virtual reality apparatus.

As described above, only exemplary embodiments of the present disclosure are provided and protective scope of the present disclosure is not limited to that. Any changes or replacements that are within the scope of the present disclosure and can be obtained by those skilled in the art should fall into the scope of the present disclosure. Therefore, protective scope of the present disclosure should be defined by the attached claims and equivalents thereof.

We claim:

1. A virtual reality apparatus, comprising:
   a display screen and a display screen support configured to support the display screen;
   a lens assembly and a barrel support configured to hold the lens assembly; and
   an object distance adjustor coupled between the display screen support and the barrel support respectively, the object distance adjustor being configured to adjust a distance between the display screen support and the barrel support,
   wherein,
   the object distance adjustor comprises a plurality of adjustment screw rods disposed perpendicularly to the display screen and located at edges of at least two opposite sides of the barrel support;
   one end of each of the adjustment screw rods is coupled to the barrel support and the other end is provided with an outer screw thread thereon;
   a plurality of first support columns, each having a tubular shape, are disposed at positions, corresponding to the adjustment screw rods respectively, on the display screen support and each are provided with inner screw threads on inner walls thereof such that the adjustment screw rods are capable of screwing into the first support columns respectively through threaded engagement between outer screw threads of the adjustment screw rods and the inner screw threads on the inner wall of the first support columns, thereby adjusting the distance between the display screen support and the barrel support by screwing the adjustment screw rods into or out of the first support columns respectively, wherein the object distance adjustor further comprises a plurality of transmission screw rods each disposed between adjacent two ones of the adjustment screw rods in a direction perpendicular to a length direction of the adjustment screw rods;

wherein, one of the plurality of adjustment screw rods is provided with an adjustment gear and the remainder ones of them are each provided with a first transmission gear;

both ends of the transmission screw rod are respectively provided with a second transmission gear, and the second transmission gear is configured to engage, for transmission, with the adjustment gear or the first transmission gear of a corresponding one of the adjustment screw rods; the adjustment gear is provided to be driven to rotate so as to drive the second transmission gears that are engaged therewith to rotate and in turn drive the adjustment screw rods to screw into or out of the first support columns respectively, thereby adjusting the distance between the display screen support and the barrel support, wherein the object distance adjustor comprises five adjustment screw rods, wherein four ones of the adjustment screw rods are respectively disposed at four corners of the barrel support and a remainder one of the adjustment screw rods is disposed at a center position of a longer side of the barrel support.

2. The virtual reality apparatus according to claim 1, wherein,
the object distance adjustor further comprises three or more support guide rods configured to be not located in a straight line;
the display screen support comprises three or more tubular second support columns corresponding to the support guide rods respectively such that one end of each of the support guide rods is fixedly coupled to a surface, facing the display screen support, of the barrel support and the other end is inserted into a corresponding one of the second support columns, forming muff-coupling between the other end and the corresponding second support column; and
each of the support guide rods is capable of reciprocating in the corresponding one of the second support columns with movement of the barrel support.

3. The virtual reality apparatus according to claim 1, wherein,
the adjustment gear, the first transmission gear and the second transmission gear are all bevel gear or angle gear.

4. The virtual reality apparatus according to claim 1, wherein,
a size of the adjustment gear is greater than that of the first transmission gear; and
a plurality of bar-shaped projections are provided at a constant interval on an outer circumference of the adjustment gear.

5. The virtual reality apparatus according to claim 1, wherein,
the lens assembly comprises a first barrel and a second barrel, and a first lens provided on the first barrel and a second lens provided on the second barrel; and
the virtual reality apparatus further comprises a pupillary distance adjustor configured to adjust a distance between the first barrel and the second barrel.

6. The virtual reality apparatus according to claim 5, wherein,
the pupillary distance adjustor comprises: two pupillary distance adjusting screw rods disposed on the barrel support and arranged parallel to a direction in which the first barrel and the second barrel are arranged; and adjustment convex lugs respectively disposed on outer walls of the first barrel and the second barrel;
one end of each of the pupillary distance adjusting screw rods is rotatablely coupled to a corresponding one of the adjustment convex lugs of the barrel support, and the other end is located outside of the barrel support;
the pupillary distance adjusting screw rods are each provided with outer screw threads thereon;
the adjustment convex lugs are each provided with inner screw threads on their inner walls; and
each of the pupillary distance adjusting screw rods is configured to pass through the corresponding one of the adjustment convex lugs such that the pupillary distance adjusting screw rods are driven to be rotated through engagement between the outer screw thread of the pupillary distance adjusting screw rods and the inner screw thread of the adjustment convex lugs, so as to drive the first barrel or the second barrel, which is in thread engagement with the pupillary distance adjusting screw rod and provided with the corresponding adjustment convex lug, to reciprocate along the barrel guide rod.

7. The virtual reality apparatus according to claim 6, wherein,
ends of the pupillary distance adjusting screw rods that are inserted into the barrel support are coupled to the barrel support through bearings respectively.

8. The virtual reality apparatus according to claim 6, wherein,
ends of the pupillary distance adjusting screw rods that are located outside the barrel support are provided with knobs respectively.

9. The virtual reality apparatus according to claim 5, wherein,
a barrel guide rod is provided on the barrel support to be parallel to a direction in which the first barrel and the second barrel are arranged;
a first fixing lug and a second fixing lug are respectively provided on outer walls of the first barrel and the second barrel, and
the barrel guide rods pass through the first fixing lug and the second fixing lug respectively such that the first barrel and the second barrel are coupled to the barrel support in such a manner that they are slidable on the barrel guide rods and are capable of reciprocating along the barrel guide rods respectively.

10. The virtual reality apparatus according to claim 1, wherein,
the barrel support is provided with a barrel lid configured to cover the barrel.

* * * * *